(12) United States Patent
Keppeler et al.

(10) Patent No.: US 6,409,914 B1
(45) Date of Patent: Jun. 25, 2002

(54) WASTE TREATMENT UNIT

(75) Inventors: K. Eugen Keppeler, Cicero; Richard Brian Dixon, East Syracuse, both of NY (US)

(73) Assignee: Crystal River Industries, Inc., Kirkville, NY (US)

( * ) Notice: Subject to any disclaimer, the term of this patent is extended or adjusted under 35 U.S.C. 154(b) by 0 days.

(21) Appl. No.: 09/643,303

(22) Filed: Aug. 22, 2000

(51) Int. Cl.[7] ............................................. B01D 33/70
(52) U.S. Cl. .................... 210/151; 210/195.4; 210/197; 210/536; 210/903; 210/920
(58) Field of Search ............................. 210/150, 151, 210/195.1, 195.3, 195.4, 197, 202, 259, 536, 903, 920

(56) References Cited

U.S. PATENT DOCUMENTS

| | | | |
|---|---|---|---|
| 3,355,023 A | * 11/1967 | Foster | 210/195.4 |
| 3,415,378 A | * 12/1968 | Fukuda | 210/195.4 |
| 3,477,949 A | 11/1969 | Liljendahl | |
| 3,526,589 A | 9/1970 | Meller | |
| 3,875,051 A | 4/1975 | Kovarik | |
| 4,465,594 A | 8/1984 | Laak | |
| 4,919,814 A | 4/1990 | Carnahan et al. | |
| 4,933,076 A | * 6/1990 | Oshima et al. | 210/195.1 |
| 4,950,396 A | * 8/1990 | Skaar et al. | 210/195.3 |
| 4,992,165 A | 2/1991 | Jensen | |
| 4,999,103 A | * 3/1991 | Bogart | 210/195.3 |
| 5,114,586 A | 5/1992 | Humphrey | |
| 5,186,821 A | 2/1993 | Murphy | |
| 5,221,470 A | * 6/1993 | McKinney | 210/195.4 |
| 5,413,706 A | 5/1995 | Graves | |
| 5,478,472 A | 12/1995 | Dilla et al. | |
| 5,609,754 A | * 3/1997 | Stuth | 210/151 |
| 5,766,454 A | * 6/1998 | Cox et al. | 210/151 |
| 5,942,108 A | * 8/1999 | Yang | 210/202 |
| 6,165,359 A | * 12/2000 | Drewery | 210/195.3 |
| 6,200,472 B1 | * 3/2001 | Donald et al. | 210/195.4 |

* cited by examiner

*Primary Examiner*—Christopher Upton
(74) *Attorney, Agent, or Firm*—August E. Roehrig, Jr.; Hancock & Estabrook, LLP

(57) ABSTRACT

An enzyme containing in-house digester unit for receiving and treating household waste material, which utilizes settling and biological treatment of solids and wastewater by means of organisms which digest the organic materials contained in the household waste thereby eliminating the need for any chemical treatment or processes.

8 Claims, 2 Drawing Sheets

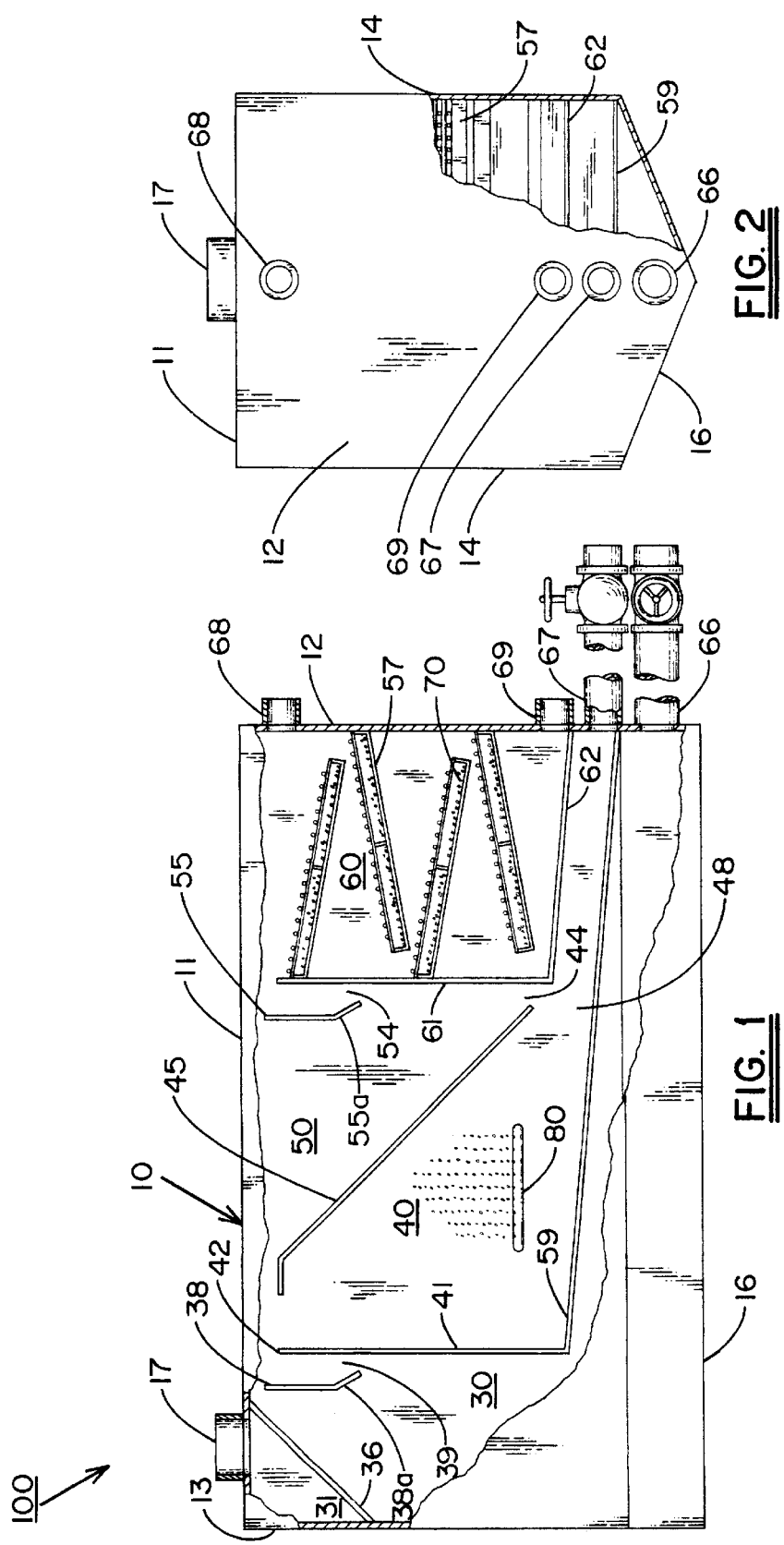

WASTE TREATMENT UNIT

BACKGROUND OF THE INVENTION

This invention relates in general to the disposal of household waste or sewage and, in particular, to the pre-treatment of such materials before they are discharged into a municipal sewer system.

More specifically, but without restriction to the particular embodiment and/or use which is shown and described herein for purposes of illustration, this invention relates to a domestic wastewater pre-treatment unit for installation in the home to pre-treat household waste or sewage prior to discharge of these materials into a municipal sewer system. Through pre-treatment of these materials inside the home, advantage is taken of the substantially constant warm temperatures to increase the efficiency of the unit's operational characteristics.

While various apparatus has been developed for use in the pre-treatment, or for the initial treatment, of sewage received at municipal sewage treatment plants from a municipal sewer system, such equipment does not address the problem of inadequate municipal sewer systems. As municipalities have grown, an ever increasing population generates more sewage which must be disposed of, and decreases the amount of land available to absorb melting snow and rainfall as new homes are built to house an ever growing population. These factors are major contributors to the cause of inadequate sewage treatment. Resolving this problem requires that existing sewage treatment facilities be expanded, which is a substantial cost to a municipality, or results in the overwhelming of the collection system by the input from the sewer system and storm system, referred to as combined sewer overflow, resulting in the spillage or overflow of raw and untreated sewage.

The first stage, or pre-treatment systems presently employed in municipal sewage treatment facilities, because of the volume of material received, are of a large construction. The present invention is intended for installation in a home to treat the sewage before the sewage leaves the home to be discharged into the municipal sewer system. To this end, the smaller volume of materials to be treated enables the treatment unit to utilize a more simple construction and configuration than a treatment process required to achieve the same result, but intended for use with the increased quantity of sewage and larger scale equipment required in a municipal sewage treatment plant.

Installation of the present invention in the home permits more efficient utilization of biological organisms to digest the organic material, rather than requiring the use of physical and or chemical processes to remove undesirable materials such as ammonia and phosphorus, which has been attempted by others as disclosed in J. R. Lira, U.S. Pat. No. 5,468,375 "WASTEWATER PRETREATMENT TANK ASSEMBLY". In the Lira patent, unlike the present invention, a chemical process is used to strip ammonia by the addition of soda ash to raise the pH level. The chemical environment thereby created strips the ammonia. Water spills over a first weir into a stripping chamber whereat an auger dispenser periodically injects a predetermined quantity of soda ash to chemically prepare any ammonia for removal from the wastewater.

In the present invention, by utilizing biological organisms to digest organic material, activated sludge and attached growth filters remove ammonia and phosphorus. There is no need to add chemicals to the tank for treating the wastewater. The use of these biological processes, and the sequential alternation of oxygenation through the chambers of the present invention, which moves the bacteria organisms sequentially between a no oxygen environment and a high oxygen environment, enhances the removal of the phosphorus by the bacteria through incorporating the phosphorus into their cells during growth.

SUMMARY OF THE INVENTION

It is, therefore, an object of the present invention to improve systems for disposing of household wastes.

Another object of this invention is to decrease the volume of household waste material or sludge discharged into a municipal sewer system.

A further object of this invention is to decrease the volume of household waste material discharged into a municipal sewer system by the utilization of an efficient biological organism digesting process.

These and other objects are attained in accordance with the present invention wherein there is provided an enzyme-containing, in-house digester unit for receiving and treating household waste material. The in-house digester utilizes settling and biological treatment of solids and wastewater by means of biological organisms to digest the organic materials contained in the household waste, eliminating the need for the addition of chemicals or chemical treatment.

DESCRIPTION OF THE DRAWING

Further objects of the present invention, together with additional features contributing thereto and advantages accruing therefrom, will be apparent from the following description of a preferred embodiment of the invention which is shown in the accompanying drawings with like reference numerals indicating corresponding parts throughout and which is to be read in conjunction with the following drawings, wherein:

FIG. 1 is a front elevational view of a preferred embodiment of the invention, with portions removed, to illustrate the interior structure thereof and the flow path of materials being treated;

FIG. 2 is an end view of the invention, with portions removed;

DESCRIPTION OF THE PREFERRED EMBODIMENT

Figure 3:
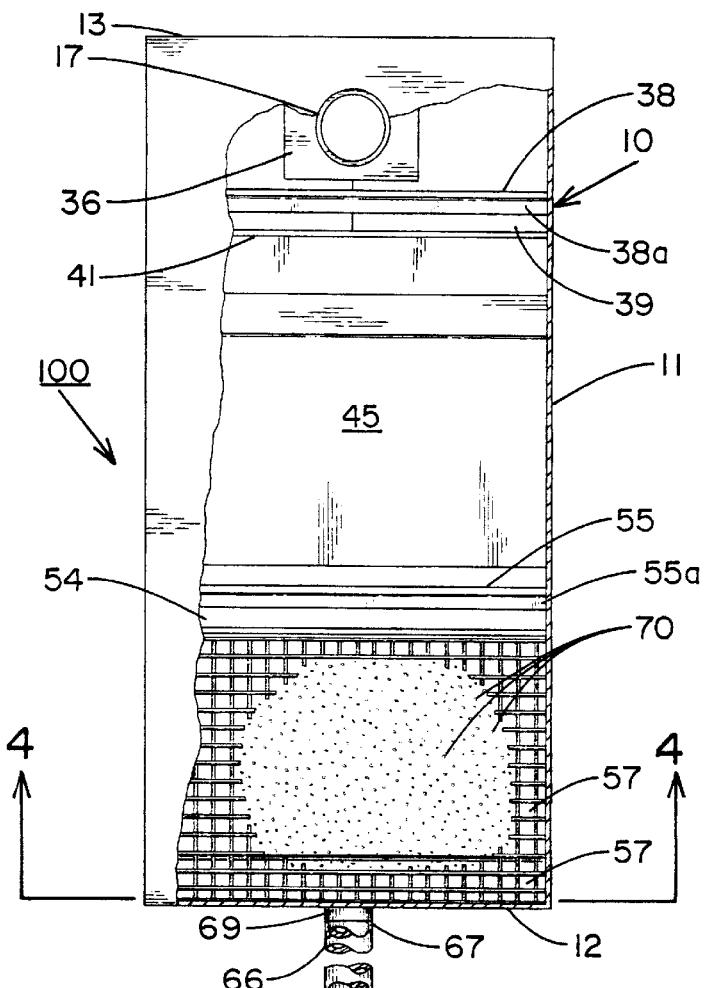
FIG. 3 is a top elevation of the invention, with portions removed, to better illustrate the chambers thereof.
Figure 4:
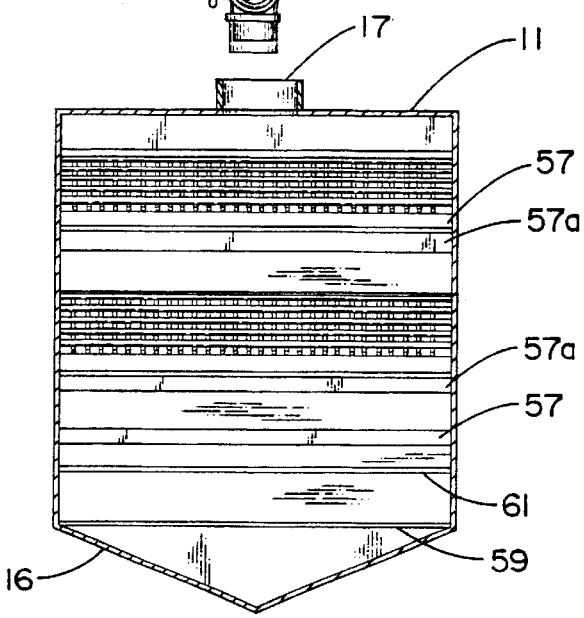
FIG. 4 is a cross sectional view taken along lines 4—4 of FIG. 1.

Referring now to FIG. 1, there is shown a cross-sectional view of a closed pre-treatment tank 10 which includes a top 11, a forward end wall 12, a rear end wall 13, side walls 14 and a bottom 16 which is sloped for a purpose to be hereinafter described in more detail. The top 11 is closed, and the tank 10 is preferably installed in the basement of a home, with an inlet connected to the down pipe from the household waterclosets.

The tank 10 comprises four chambers, a first or primary chamber 30 wherein larger solids materials settle and are gravitationally compacted; a second chamber 40 wherein further settling and digestion occurs; a third settling or anaerobic biological digestion chamber 50 wherein, after digestion, accumulated solids and sludge are believed to settle out from the liquid, and a portion thereof is recycled into chamber 40 to be used in the activated sludge process, and a fourth or attached growth media chamber 60 which biologically treats the wastewater to remove ammonia and phosphorus, and lowers the BOD, prior to discharge of the effluent from the tank. These chambers, and the components thereof, will be further discussed in detail hereinafter.

In the main or primary chamber 30, primary settling occurs and anaerobic digestion begins. Chamber 30 includes an inlet zone 31 whereat mixing and dispersion of the solids material into the liquid occurs, and the flow of solids and wastewater entering the tank is dampened. In the primary chamber suspended solids, such as grease, oil and fats, float on top of the liquid contained therein at a level which is determined by the upper edge of a baffle plate 38 extending between the spaced sidewalls 14. Beneath the suspended solids is a high-flow zone which accommodates periods of moderate or high flow such as occurs when using a shower, dishwasher or washing machine.

As the solids materials settle out of the liquid, the solids begin the anaerobic digestion process. Specially selected and seeded biological digestion organisms, preferably two groups of bacteria, an acid forming anaerobic bacteria and a methane forming bacteria, and an enzyme complex such as Biotol-ST, which consists of protein, starch, cellulose, fat grease and oil digesting enzymes, are added to the tank for sludge digestion. These are available from Biotol Inc. 6595 Edenville Blvd., Suite 155, Eden Prairie, Minn. 55346. The nitrifying organisms or bacteria are available from Bacta-Pure International Ecological Technologies, Inc. P.O. Box 208, North Hatley QC, JOB 2C0, CANADA, which contain the microorganisms Nitrobacter and Nitrosomonas in an aqueous solution. These materials are added to the tank 10 at start-up as set forth below.

For a treatment tank having a volume sufficient for a typical household, which generally would be capable of handling approximately 100 gallons of liquid, it has been found that the addition at start-up of approximately 1000 ml of nitrifying organisms and approximately 500 ml of digestion organisms is preferred. Thereafter, on a weekly basis 100 ml of nitrifying organisms and 50 ml of digestion organisms and 50 ml of enzyme complex are added, or if a monthly protocol is preferred, 500 ml nitrifying organisms and 250 ml digestion organisms are added to maintain the system in operation. Either a weekly or a monthly protocol may be utilized. These enzymes and bacteria accelerate and facilitate the digestion and other tank processes.

When household waste enters the tank 10 from the household downpipe, the waste passes through the inlet port 17 into the inlet zone 31 of chamber 30. The waste is accelerated by the vertical drop, and strikes a diffuser plate 36 upon entry into the tank. The diffuser plate 36, because of the momentum generated by the vertical drop of the falling waste, functions to break up large solid matter, and to reduce the velocity of the waste entering the tank acting as a baffle or turbulence suppressor to minimize the turbulence caused by the entry of the waste into the tank.

The material which enters the tank 10 through the inlet opening 17 is not uniformly distributed and, therefor, upon entry into the tank the particles rapidly mix with the liquid contained in the tank forming a suspension of solids material. Because of the quiescent state of the tank contents, most of the suspended particles will either discretely settle, or agglomerate and settle to the bottom of the tank forming a layer of solids material at the tank bottom whereat anaerobic digestion occurs converting the solids material into sludge.

Particles which are lighter, or less dense than water, will float to the surface of the liquid in the tank to form a surface scum between the wall 13 and another baffle or weir, settling chamber baffle or weir 38. The top of baffle 38 is spaced from the inner surface of the tank top 11, and extends the width of the tank between the side walls 14.

The depth of settling chamber baffle 38, including an angular portion 38a extending away from the inlet 17 and towards the second or activated sludge chamber 40, defines a zone wherein the liquid which has small quantities of suspended biological solids can pass through a throat 39 defined by the lower edge of baffle 38 and a wall 41 which extends the width of the tank 10 and defines in part the activated sludge chamber 40.

That portion of chamber 30 beneath the floating materials and above the accumulated solids materials at the bottom of the tank which are undergoing the anaerobic digestion process and accumulation for removal from the tank through the outlet 66, is not defined by tank structure but by a gradient increase in the solids content of the liquid contained in the tank 10 as the solids materials settle to the tank bottom 16.

As a result of the settling, dewatering and digesting of the solids material contained in the liquid, the bottom of the tank will contain both actively digesting solids and digested sludge. The longer the time the solids materials remain in the primary chamber 30 of the unit, the greater the amount of sedimentation that will occur, the more the bacterial and digestive enzymes will be able to reduce the sludge volume and the more of the suspended solids material that will be removed from the liquid. Digested biologic solids materials move to the bottom of the tank 10 because of the downward slope of the tank bottom 16, and are removed through a digested sludge outlet 66 in the wall 12 of the tank.

Two groups of bacteria develop in the sludge creating the digestion process. Acid forming anaerobic bacteria metabolize the organic matter forming organic acids, carbon dioxide and methane. Carbon dioxide and methane are the end products of this digestion. Organic acids are an intermediary byproduct and provide the substrate for the methane forming anaerobic bacteria to grow. Methane-forming bacteria use organic acids to produce carbon dioxide and methane. Periodically these necessary bacteria must be replenished and must be added to the system.

In order for the liquid in the chamber 30 to pass into the chamber 40, the liquid must move through the throat 39 defined by the lowermost edge of baffle 38 and the wall 41, and over the uppermost edge 42 of the wall 41. The uppermost edge 42 of wall 41 is positioned at a level below that of the uppermost edge of settling chamber baffle 38 so that the liquid contained in the tank is constrained to flow over the edge of the wall 41 and vertically downward into the activated sludge chamber 40. The angulation of the lower portion 38a of baffle 38 allows for a controlled extraction of the settled or clarified liquid at a controlled rate such that the movement of the liquid does not disrupt the settling or digestion process. The throat 39 prevents large solids from being carried, during high flow periods, into the activated sludge chamber 40. The downward angled slope of the lower portion 38a of the baffle 38 causes any fine solids that might accumulate on the baffle to slide down off the baffle for accumulation in the bottom of the tank.

The liquid then enters a second treatment chamber 40. This chamber is defined by wall 41, bottom 59 and an angled baffle 45. Near the bottom of this chamber is a bubbler 80 that introduces a low volume of air into chamber 40. This introduction of air accomplishes several things: the introduction of air moves the digestion process from an anaerobic state toward an aerobic state, and the natural movement of the bubbles upward through the liquid in chamber 40 cause a counterclockwise circulation within chamber 40. This circulation of liquid, combined with the natural movement of bubbles upward, causes further breakup of large organic solids to smaller particles. A froth forms in the top of chamber 40 and an activated sludge processes is promoted in chamber 40.

While the liquid is recirculating in chamber 40, a small portion of the liquid traveling up the baffle or wall 45 is passed through a throat 44 defined by the lowermost edge of the baffle 45, and a wall 61 which defines in part chamber 50. The liquid moves upward into the chamber 50. The angulation of the baffle 45 allows for the extraction of the solids from the chamber 50 at a controlled rate to clarify the liquid and causes any removed solids that might accumulate on the baffle 45 during this process to slide back down through the throat 44 into a portion 48 of the chamber 40, defined by a bottom well 62 of digestion chamber 60, discharge outlet 67 and the bottom wall 59, whereat solids material which accumulates therein is passed out of the tank through the discharge outlet 67, controlled by a suitable gate valve. A baffle or weir 55 is positioned within the chamber 50 with the top of the baffle 55 spaced from the inner surface of the tank top 11, and extending the width of the tank between the side walls 14. The depth of baffle or weir 55, including an angular portion 55a extending away towards the wall 61 of digestion chamber 60, defines a zone wherein the clarified liquid can pass through a throat 54 which extends the width of the tank 10.

The posterior wall 61 of the biological digestion chamber 60, which is common with the settling chamber 50, forms a part of the anterior wall thereof. An overflow outlet 68 is provided in the wall 12 of the tank 10 as a precaution in the unlikely event that for some reason the digestion chamber 60 would become plugged, enabling the liquid to leave the unit through this overflow outlet and be passed into the sewer.

The treated liquid passes over the wall 61 onto a series of inclined shelves or plates 57, best illustrated in FIGS. 1 and 3, one end of each being secured to one of wall 61 or anterior or forward wall 12 and extending between the tank sidewalls 14, to which they are also secured. Because of the slight incline of the plates 57, the liquid travels or trickles slowly down each plate 57 before reaching the main tank outlet 69 whereat the liquid leaves the tank and is discharged into a sewer system. In order to maintain a small quantity of liquid on the plates 57 at all times, a solid divider plate 57a divides each shelf 67 to maintain moisture in the shelf.

To biologically treat the clarified liquid, inert inorganic or biofilter material 70 is used as a substrate for the biologic growth of the organisms that are seeded into the tank 10 upon installation. Such a suitable material, an inert plastic substrate is available from Aquatic Ecosystems, Inc., 1767 Benbow Ct., Apopka, Fla. 32703-7730. Slime forming bacteria create a layer over the inorganic or biofilter material 70 with the inner layer developing anaerobic bacteria, while the outer layer develops aerobic bacteria. Bacteria synthesize organic matter and solids, and the protozoans present consume bacteria. High removal rates of bacteria by protozoans cause increased bacterial growth, and thereby further enhance removal rates of organic matter. Nitrifying bacteria compete for space on the biofilter media. The lower the organic loading to the filter, the greater the rate of nitrification.

Each of the shelves 57 holds the inert biological substrate for growth of these desirable organisms. Because of the liquid distribution passing over the wall 61, all of the clarified liquid is passed over the substrate 70, and the organisms growing thereon and therein, treating the liquid prior to discharge into the sewer system. The bottom or floor 62 of the digestion chamber 60 is pitched down towards the anterior or forward wall 12 of the tank and the outlet 69 to prevent accumulation of biological material.

While this invention has been described and explained with reference to a preferred embodiment, the structure of which has been disclosed herein, it will be understood by those skilled in the art to which this invention pertains that various changes may be made and equivalents may be substituted for elements thereof without departing from the invention. Therefore, it is intended that the invention not be limited to the particular embodiment disclosed in the specification and shown in the drawings as the best mode presently known by the inventor(s) for carrying out this invention, nor confined to the details set forth, but that the invention will include all embodiments, modifications and changes as may come within the scope of the following claims:

What is claimed is:

1. Wastewater pretreatment tank assembly to be interposed between a wastewater source and a sewer system that leads to a downstream sewage treatment facility, the tank assembly comprising a shell having a bottom, a top, sides and first and second end walls, said shell having first and second weirs interposed between said first and second end walls, said shell having a divider wall interposed between said top and bottom, said first end wall, said first weir and said divider wall defining a first chamber between said shell sides, means coupled to said wastewater source for introducing wastewater into said first chamber so that solids in said wastewater settle to the bottom in said first chamber and undergo digestion, said divider wall and a baffle plate defining a second activated sludge chamber, and including means for further removing suspended solids from the wastewater that has spilled from said first chamber over said divider wall into said second chamber, said baffle plate, said second weir and a second divider wall defining a settling chamber where said wastewater from said second chamber enters so that solids in said wastewater settle to the bottom, said settling chamber including means for recycling said solids into said second chamber to enhance activated sludge processing, said second divider wall and said second end wall defining a fourth biological filtration chamber and including means for biologically removing ammonia and BOD from said wastewater that has spilled into said fourth chamber from said third chamber, a drain overflow for directing treated wastewater into said sewer system and a port open to said fourth chamber through which the treated wastewater is passed into said sewer system, and a sludge evacuation conduit having an inlet end in communication with the bottom of said first chamber, an outlet end connectable to said sewer system, and a valve interposed in said sludge evacuation conduit and connectable for normally retaining in said first chamber wastewater and sludge up to the level of said first weir, said valve being selectively operable for permitting discharge of the digested sludge from said first chamber into the sewer system.

2. The wastewater pretreatment tank assembly of claim 1 wherein said means for further removing suspended solids from the wastewater that has spilled from said first chamber over said divider wall into said second chamber includes a bubbler to introduce a low volume of air into said second chamber.

3. The wastewater pretreatment tank assembly of claim 1 wherein said baffle plate is positioned at an angle relative to said second divider wall to facilitate the removal of solids that accumulate on said baffle plate.

4. The wastewater pretreatment tank assembly of claim 1 further including a sludge evacuation outlet coupled to said activated sludge chamber.

5. The wastewater pretreatment tank assembly of claim 1 wherein said means for biologically removing ammonia and BOD from said wastewater that has spilled into said fourth chamber from said third chamber includes organic synthesizing bacteria.

6. The wastewater pretreatment tank assembly of claim 5 wherein said organic matter synthesizing bacteria is supported on an inert inorganic bio-filter material.

7. The wastewater pretreatment tank assembly of claim 5 wherein said organic matter synthesizing bacteria supported on said inert organic bio-filter material is carried on a plurality of inclined plates.

8. The wastewater pretreatment tank assembly of claim 7 wherein said plurality of inclined plates each include a solid divider plate in order to maintain a small quantity of liquid on said plurality of plates at all times.

* * * * *